US010223472B2

(12) United States Patent
Sacerdote et al.

(10) Patent No.: US 10,223,472 B2
(45) Date of Patent: Mar. 5, 2019

(54) SYSTEMS AND METHODS FOR PROVIDING PROGRESSIVE IMAGES BASED ON DATA RANGE REQUESTS

(71) Applicant: Facebook, Inc., Menlo Park, CA (US)

(72) Inventors: David Andrew Sacerdote, Palo Alto, CA (US); Georges Edouard Maurice Berenger, Menlo Park, CA (US); Federico Daniel Larumbe, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 269 days.

(21) Appl. No.: 14/969,543

(22) Filed: Dec. 15, 2015

(65) Prior Publication Data

US 2017/0169019 A1 Jun. 15, 2017

(51) Int. Cl.
*G06F 15/16* (2006.01)
*G06F 17/30* (2006.01)

(52) U.S. Cl.
CPC ............................ *G06F 17/30905* (2013.01)

(58) Field of Classification Search
CPC ................................................ G06F 17/30047
See application file for complete search history.

(56) References Cited

U.S. PATENT DOCUMENTS

| 6,417,887 B1* | 7/2002 | Yamaji | H04N 7/012 348/447 |
| 2003/0210347 A1* | 11/2003 | Kondo | H04N 7/0145 348/383 |
| 2006/0095410 A1* | 5/2006 | Ostrover | H04N 7/163 |
| 2007/0014568 A1* | 1/2007 | Nagao | H04N 1/00278 396/429 |
| 2007/0098275 A1* | 5/2007 | Lee | G06T 9/007 382/233 |
| 2007/0133017 A1* | 6/2007 | Kobayashi | G06T 5/009 358/1.9 |
| 2008/0303940 A1* | 12/2008 | Baker | G06T 3/4023 348/445 |
| 2008/0310741 A1* | 12/2008 | Chen | H04N 19/60 382/233 |
| 2010/0104003 A1* | 4/2010 | Dunn | H04N 7/16 375/240.01 |

(Continued)

*Primary Examiner* — Richard G Keehn
(74) *Attorney, Agent, or Firm* — Sheppard Mullin Richter & Hampton LLP

(57) ABSTRACT

Systems, methods, and non-transitory computer-readable media can request a lower quality version of an image. The image can correspond to a progressive image. A first quantity of progressive image scans included in the progressive image can be acquired. The first quantity of progressive image scans can represent the lower quality version of the image. A command to access a higher quality version of the image can be acquired. A data range associated with a second quantity of progressive image scans included in the progressive image can be identified. The second quantity of progressive image scans can be combinable with the first quantity of progressive image scans to represent the higher quality version of the image. The second quantity of progressive image scans can be acquired based on the data range. The higher quality version of the image can be generated based on combining the first quantity and the second quantity.

20 Claims, 8 Drawing Sheets

(56) References Cited

U.S. PATENT DOCUMENTS

| | | | | |
|---|---|---|---|---|
| 2011/0307935 A1* | 12/2011 | Kotecha | ............ | H04N 21/23439 |
| | | | | 725/119 |
| 2012/0030769 A1* | 2/2012 | De Laet | .................... | H04N 7/16 |
| | | | | 726/26 |
| 2012/0287998 A1* | 11/2012 | Sato | ........................ | H04N 19/61 |
| | | | | 375/240.12 |
| 2014/0286415 A1* | 9/2014 | Kang | .................... | H04N 19/597 |
| | | | | 375/240.12 |
| 2014/0327751 A1* | 11/2014 | King | .................. | A61B 1/00105 |
| | | | | 348/75 |
| 2015/0023609 A1* | 1/2015 | Mody | .................... | H04N 19/44 |
| | | | | 382/233 |
| 2015/0085147 A1* | 3/2015 | Georgy | ................ | G02B 27/646 |
| | | | | 348/208.1 |
| 2016/0225349 A1* | 8/2016 | Lee | .......................... | G09G 5/34 |

* cited by examiner

SYSTEMS AND METHODS FOR PROVIDING PROGRESSIVE IMAGES BASED ON DATA RANGE REQUESTS

FIELD OF THE INVENTION

The present technology relates to the field of multimedia or media content processing. More particularly, the present technology relates to techniques for providing progressive images based on data range requests.

BACKGROUND

Today, people often utilize computing devices (or systems) for a wide variety of purposes. Users can use their computing devices to, for example, interact with one another, access content, share content, and create content. In some cases, users can utilize their computing devices to download, view, or otherwise access media content. For instance, users of a social networking system (or service) can, via their computing devices, access their feeds or other users' profiles to view various posts that include media content items, such as images. In another instance, users can utilize their computing devices to view or access images via web resources, such as webpages, websites, or online applications.

Under conventional approaches rooted in computer technology, transmitting an entire image at its full resolution can, in some cases, require a significant amount of data. In many instances, users' computing devices (or systems) may have limited data access, such as due to restricted cellular data plans or poor network conditions. Moreover, in some instances, users' computing devices may not necessarily have the capabilities (e.g., due to limited display screen sizes or resolutions) to efficiently utilize entire images at full resolutions. Furthermore, conventional approaches to providing images can store multiple versions of an image to serve in various scenarios, which can cause data storage inefficiency. As such, conventional approaches can create challenges for or reduce the overall experience associated with utilizing media content such as images.

SUMMARY

Various embodiments of the present disclosure can include systems, methods, and non-transitory computer readable media configured to request a lower quality version of an image. The image can correspond to a progressive image. A first quantity of progressive image scans included in the progressive image can be acquired. The first quantity of progressive image scans can represent the lower quality version of the image. A command to access a higher quality version of the image can be acquired. A data range associated with a second quantity of progressive image scans included in the progressive image can be identified. The second quantity of progressive image scans can be combinable with the first quantity of progressive image scans to represent the higher quality version of the image. The second quantity of progressive image scans can be acquired based on the data range. The higher quality version of the image can be generated based on combining the first quantity and the second quantity.

In an embodiment, identifying the data range associated with the second quantity of progressive image scans included in the progressive image can further comprise acquiring information included in an image header for the image. A last scan in the first quantity of progressive image scans can be identified based on the information included in the image header. A starting scan in the second quantity of progressive image scans can be identified. The starting scan in the second quantity can be subsequent to the last scan in the first quantity. An ending scan in the second quantity of progressive image scans can be identified based on at least one of the information included in the image header, a system configuration, a device property, a network condition, a defined setting, or a user preference. The starting scan and the ending scan can be respectively associated with a start and an end for the data range.

In an embodiment, the image header can include a proprietary header. At least some of the information included in the image header can be incorporated in the proprietary header.

In an embodiment, acquiring the second quantity of progressive image scans based on the data range can further comprise generating a uniform resource locator (URL) that indicates the data range. A request for the second quantity of progressive image scans can be transmitted to a content providing system. The request can be associated with the URL. The second quantity of progressive image scans can be received from the content providing system.

In an embodiment, acquiring the second quantity of progressive image scans based on the data range can further comprise generating a Hypertext Transfer Protocol (HTTP) range request that includes a byte range corresponding to the data range. The byte range can be incorporated into a HTTP header associated with the HTTP range request. The HTTP range request can be transmitted to a content providing system. Data corresponding to the byte range can be received from the content providing system. The data can represent the second quantity of progressive image scans.

In an embodiment, generating the higher quality version of the image based on combining the first quantity and the second quantity can further comprise removing a first terminator element subsequent to the first quantity of progressive image scans. The second quantity of progressive image scans can be appended to the first quantity of progressive image scans. A second terminator element can be added subsequent to the second quantity that has been appended to the first quantity.

In an embodiment, the command to access the higher quality version of the image can be associated with at least one of a user interaction, a change in network connectivity, a social engagement trigger, or a time trigger.

In an embodiment, the lower quality version of the image can be lower in resolution than the higher quality version of the image.

In an embodiment, the lower quality version of the image can be associated with at least one of a preview version of the image or a thumbnail version of the image. The higher quality version of the image can be associated with at least one of a full-screen displayable version of the image or an original resolution version of the image.

In an embodiment, the progressive image can correspond to a progressive Joint Photographic Experts Group (JPEG) image. Each progressive image scan in the first quantity and in the second quantity can correspond to a respective progressive JPEG scan included in the progressive JPEG image.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
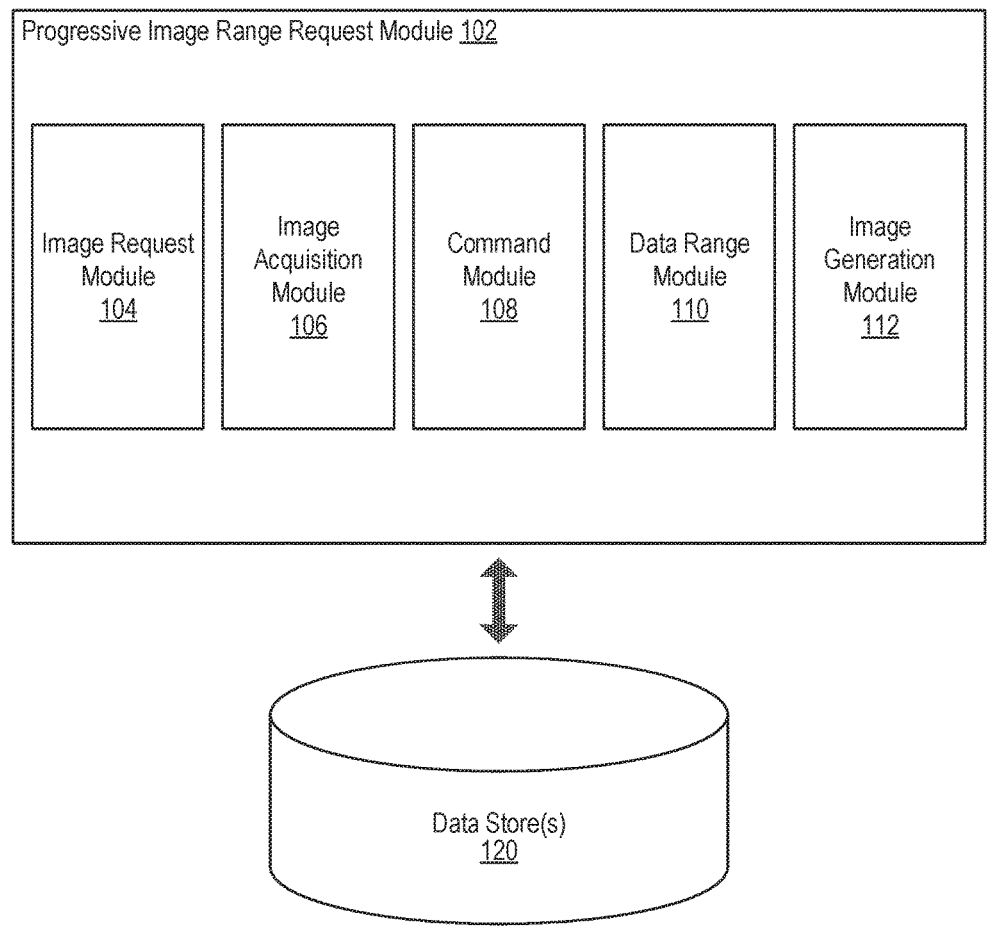
FIG. 1 illustrates an example system including an example progressive image range request module configured to facilitate providing progressive images based on data range requests, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Progressive Images Based on Data Range Requests

People use computing systems (or devices) for various purposes. Users can utilize their computing systems to establish connections, engage in communications, interact with one another, and/or interact with various types of content. In some cases, a user of a computing device can access media content. For example, the user can utilize his or her computing device to access a social networking system (or service). In this example, the user can download, view, or otherwise interact with a media content item, such as an image, via the user's newsfeed, via pages associated with other entities, and/or via profiles associated with other users of the social networking system. In another example, the user can view or access images (including videos or sets of video image frames) via various resources, such as webpages, websites, applications, and/or local albums, etc.

Under conventional approaches rooted in computer technology for media processing, often times media content items such as images are provided or transmitted at their full, original image sizes (e.g., full, original resolutions). Transmission of an entire image at its full resolution under conventional approaches can require a significant or non-trivial amount of data, which may be limited based on the user's data plan (e.g., cellular data plan). Moreover, in accordance with conventional approaches, network conditions may sometimes not be suitable to allow for efficient transmission of the entire image at its full resolution. Additionally, such conventional approaches to providing images can be inefficient or wasteful when the user's computing device does not require the entire image at its full resolution or when the user's computing device lacks the capability to efficiently utilize the entire image at its full resolution.

Furthermore, in some cases, users who indeed have access to computing devices with adequate image processing capabilities and/or who indeed have access to reliable networks may desire to receive entire images at full resolutions. As such, this can result in conventional approaches having to store multiple versions of each image in a cache. For example, under conventional approaches, it can be necessary for a cache of a content delivery network to store at least a low quality (e.g., low resolution) version of an image and a high resolution (e.g., high resolution) version of the image, such that the cache can provide, deliver, transmit, or make available whichever version of the image is suitable based on a request for the image. However, such conventional approaches can cause inefficiencies for data storage, since each image can require multiple versions to be stored or cached.

Due to these or other concerns, conventional approaches can be disadvantageous or problematic. Therefore, an improved approach can be beneficial for addressing or alleviating various drawbacks associated with conventional approaches. Based on computer technology, the disclosed technology can provide progressive images based on data range requests. Various embodiments of the present disclosure can include systems, methods, and non-transitory computer readable media configured to request a lower quality version of an image. The image can correspond to a progressive image. A first quantity of progressive image scans included in the progressive image can be acquired. The first quantity of progressive image scans can represent the lower quality version of the image. A command to access a higher quality version of the image can be acquired. A data range associated with a second quantity of progressive image scans included in the progressive image can be identified. The second quantity of progressive image scans can be combinable with the first quantity of progressive image scans to represent the higher quality version of the image. The second quantity of progressive image scans can be acquired based on the data range. The higher quality version of the image can be generated based on combining the first quantity and the second quantity. It is contemplated that there can be many variations and/or other possibilities associated with the disclosed technology.

FIG. 1 illustrates an example system 100 including an example progressive image range request module 102 configured to facilitate providing progressive images based on data range requests, according to an embodiment of the present disclosure. As shown in the example of FIG. 1, the progressive image range request module 102 can include an image request module 104, an image acquisition module 106, a command module 108, a data range module 110, and an image generation module 112. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the progressive image range request module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the progressive image range request module 102 can be implemented, in part or in whole, as software running on one or more computing devices or systems, such as on a user or client computing device. For example, the progressive image range request module 102 or at least a portion thereof can be implemented as or within an application (e.g., app), a program, an applet, or an operating system, etc., running on a user computing device or a client computing system, such as the user device 610 of FIG. 6. In another example, the progressive image range request module 102 or at least a portion thereof can be implemented using one or more computing devices or systems that include one or more servers, such as network servers or cloud servers. In some instances, the progressive image range request module 102 can, in part or in whole, be implemented within or configured to operate in conjunction with a social networking system (or service), such as the social networking system 630 of FIG. 6. It should be appreciated that there can be many variations or other possibilities.

The image request module 104 can be configured to facilitate requesting a lower quality version of an image. The image can correspond to a progressive image, such as a progressive Joint Photographic Experts Group (JPEG) image. In some cases, the image request module 104 can request the lower quality version of the image when a preview or a thumbnail of the image is to be provided. In one example, when a social networking system feed is provided for a viewing user, one or more lower quality versions of images can be provided in the feed based on requests by the image request module 104. In this example, when the viewing user clicks on or interacts with the one or more lower quality versions, one or more higher quality versions of the respective images can then be provided based on subsequent requests made by the image request module 104. In another example, when a computing device is experiencing poor or costly network conditions, the image request module 104 running on the computing device can request a lower quality version of the image. In this example, when network conditions change, the image request module 104 can then request a higher quality version of the image. It should be appreciated that all examples herein provided for illustrative purposes and that many variations associated with the disclosed technology are possible.

The image acquisition module 106 can be configured to facilitate acquiring a first quantity of progressive image scans included in the progressive image (e.g., a first set of scans in a progressive JPEG image). The first quantity of progressive image scans can represent the lower quality version of the image. In one instance, the progressive JPEG image can include eight scans, which can be utilized to display the image in its full resolution. In this instance, a lower resolution version of the image can be displayed using only the first three scans. As such, the image acquisition module 106 can, in this instance, acquire the first three scans. In some implementation, the disclosed technology can utilize predefined logic or a specified setting(s) to determine or identify the first quantity of progressive image scans. The image acquisition module 106 can then receive, retrieve, or otherwise acquire the determined or identified first quantity of progressive image scans.

The command module 108 can be configured to facilitate acquiring a command to access a higher quality version of the image. In some cases, the command to access the higher quality version of the image can be associated with at least one of a user interaction, a change in network connectivity, a social engagement trigger, or a time trigger. In one example, the command module 108 can detect, receive, recognize, or otherwise acquire the command when a viewing user clicks on, taps on, or interacts with the lower quality version (e.g., preview, thumbnail, etc.) of the image to cause the higher quality version (e.g., higher resolution, full/original resolution, etc.) of the image to become accessible. In another example, the command module 108 can acquire (i.e., detect, receive, recognize, etc.) the command when network conditions improve, such as when transitioning from a cellular data network to a Wi-Fi network. In a further example, the command module 108 can acquire the command when the viewing user engages with the lower quality version of the image in a social networking system, such as by liking, sharing, or commenting on, etc., the lower quality version of the image. In another example, the command module 108 can acquire the command when the viewing user has been viewing the lower quality version of the image for a specified minimum threshold duration of time. Again, it should be understood that all examples herein are provided for illustrative purposes and that there can be many variations or other possibilities associated with the disclosed technology.

The data range module 110 can be configured to facilitate identifying a data range associated with a second quantity of progressive image scans included in the progressive image. The second quantity of progressive image scans can be combinable with the first quantity of progressive image scans to represent the higher quality version of the image. The data range module 110 can also be configured to facilitate acquiring the second quantity of progressive image scans based on the data range. In some implementations, the data range module 110 can communicate and/or operate in conjunction with the image acquisition module 106 to acquire the second quantity of progressive image scans based on the data range. More details regarding the data range module 110 will be provided below with reference to FIG. 2A.

The image generation module 112 can be configured to facilitate generating the higher quality version of the image based on combining the first quantity and the second quantity. The image generation module 112 will be discussed in more detail below with reference to FIG. 2B.

In some embodiments, the lower quality version of the image can be lower in resolution than the higher quality version of the image. In some cases, the lower quality version of the image can be associated with at least one of a preview version of the image or a thumbnail version of the image, etc., and the higher quality version of the image can be associated with at least one of a full-screen displayable version of the image or an original resolution version of the image, etc. Moreover, in some instances, the progressive image can correspond to a progressive Joint Photographic Experts Group (JPEG) image, and each progressive image scan in the first quantity and in the second quantity can correspond to a respective progressive JPEG scan included in the progressive JPEG image.

Additionally, in some embodiments, the progressive image range request module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the progressive image range request module 102. Again, it is contemplated that there can be many variations or other possibilities associated with the disclosed technology.

Figure 2A:
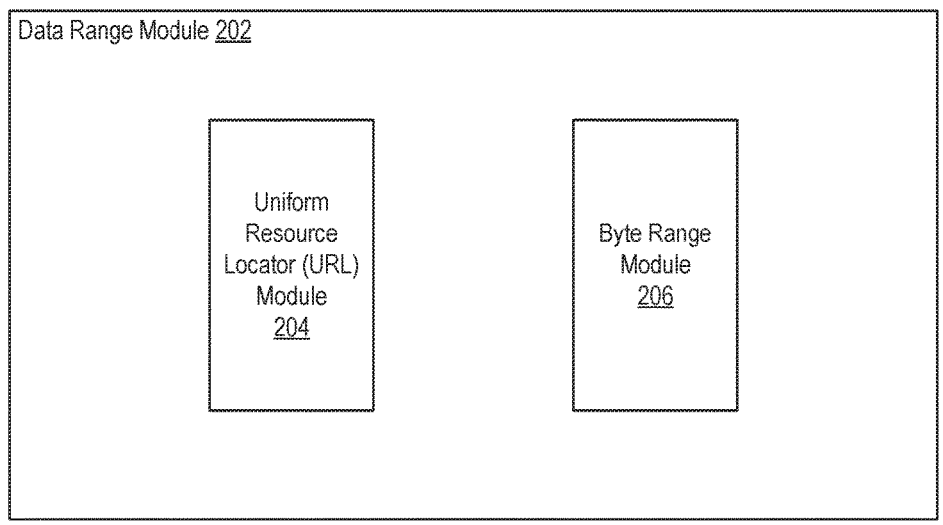
FIG. 2A illustrates an example data range module configured to facilitate providing progressive images based on data range requests, according to an embodiment of the present disclosure.

FIG. 2A illustrates an example data range module 202 configured to facilitate providing progressive images based on data range requests, according to an embodiment of the present disclosure. In some embodiments, the data range module 108 of FIG. 1 can be implemented as the data range module 202. As shown in the example of FIG. 2A, the data range module 202 can include a uniform resource locator (URL) module 204 and a byte range module 206.

As discussed previously, the data range module 202 can be configured to facilitate identifying a data range associated with a second quantity of progressive image scans included in a progressive image. The second quantity of progressive image scans can be combinable with a first quantity of progressive image scans to represent a higher quality version of an image. In some embodiments, the data range module 202 can acquire information included in an image header for the image (e.g., metadata in a JPEG header for a progressive JPEG image). The data range module 202 can identify, based on the information included in the image header, a last scan in the first quantity of progressive image scans. The data range module 202 can also identify a starting scan in the second quantity of progressive image scans. In some cases, the starting scan in the second quantity can be identified as being subsequent to the last scan in the first quantity. For example, the information in the image header can indicate that the first quantity includes Scan #1, Scan #2, and Scan #3, such that Scan #3 is the last scan in the first quantity. In this example, the data range module 202 can identify the starting scan in the second quantity as being Scan #4.

Moreover, the data range module 202 can identify an ending scan in the second quantity of progressive image scans based on at least one of the information included in the image header (e.g., image metadata), a system configuration (e.g., system logic), a device property (e.g., device display dimensions), a network condition (e.g., network type and/or quality), a defined setting (e.g., via a look-up table), or a user preference (e.g., manual selection). For example, the data range module 202 can be implemented on a particular computing device (or system) and can identify the ending scan in the second quantity to be Scan #7 for the particular computing device. In some cases, the data range module 202 can identify the ending scan by selecting, or receiving a selection of, a number of scans for the second quantity. In this example, the data range module 202 can select four scans, such that the ending scan is Scan #7, or four scans from the starting scan (Scan #4). In some instances, the starting scan and the ending scan can be respectively associated with a start and an end for the data range. Continuing with the previous example, the data range can start with Scan #4 and can end with Scan #7. Additionally, in some cases, the image header can include a proprietary header, and at least some of the information included in the image header can be incorporated in the proprietary header. Many variations are possible.

Furthermore, the data range module 202 can also be configured to facilitate acquiring the second quantity of progressive image scans based on the data range. In some implementations, the data range module 202 can utilize the uniform resource locator (URL) module 204 to facilitate acquiring the second quantity of progressive image scans based on the data range. The URL module 204 can generate a URL that indicates the data range. The URL module 204 can transmit, to a content providing system (e.g., a content delivery network), a request for the second quantity of progressive image scans. The request can be associated with the URL. For example, the URL can indicate that Scan #4 through Scan #7 are requested. The second quantity of progressive image scans can then be received from the content providing system.

In some embodiments, the data range module 202 can utilize the byte range module 206 to facilitate acquiring the second quantity of progressive image scans based on the data range. The byte range module 206 can generate a Hypertext Transfer Protocol (HTTP) range request that includes a byte range corresponding to the data range. In one example, when the second quantity includes Scan #4 through Scan #7, the byte range can specify the first byte corresponding to the beginning of Scan #4 and the last byte corresponding to the end of Scan #7. The byte range can be incorporated into a HTTP header associated with the HTTP range request. The byte range module 206 can transmit, to a content providing system, the HTTP range request. Data corresponding to the byte range can then be received from the content providing system. The data can represent the second quantity of progressive image scans. As discussed, it is contemplated that many variations associated with the disclosed technology are possible.

Figure 2B:
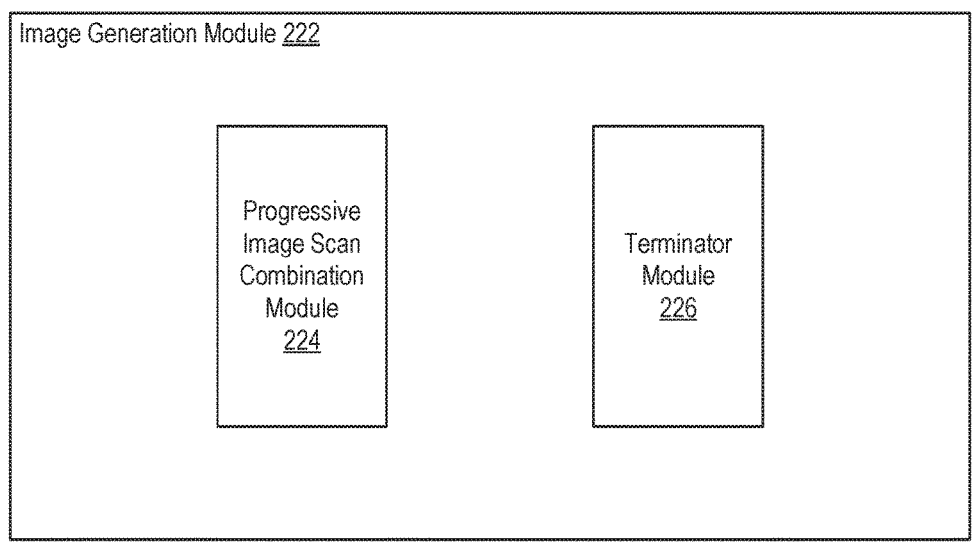
FIG. 2B illustrates an example image generation module configured to facilitate providing progressive images based on data range requests, according to an embodiment of the present disclosure.

FIG. 2B illustrates an example image generation module 222 configured to facilitate providing progressive images based on data range requests, according to an embodiment of the present disclosure. In some embodiments, the image generation module 112 of FIG. 1 can be implemented as the example image generation module 222. As shown in FIG. 2B, the image generation module 222 can include a progressive image scan combination module 224 and a terminator module 226.

In some embodiments, the image generation module 222 can utilize the progressive image scan combination module 224 to facilitate generating a higher quality version of an image based on combining a first quantity of progressive image scans and a second quantity of progressive image scans. In some cases, generating the higher quality version of the image based on combining the first quantity and the second quantity can further comprise removing, by the terminator module 226, a first terminator element subsequent to the first quantity of progressive image scans. The second quantity of progressive image scans can be appended, by the progressive image scan combination module 224, to the first quantity of progressive image scans. Additionally, the terminator module 226 can add a second terminator element subsequent to the second quantity that has been appended to the first quantity. Again, many variations are possible.

Figure 3:
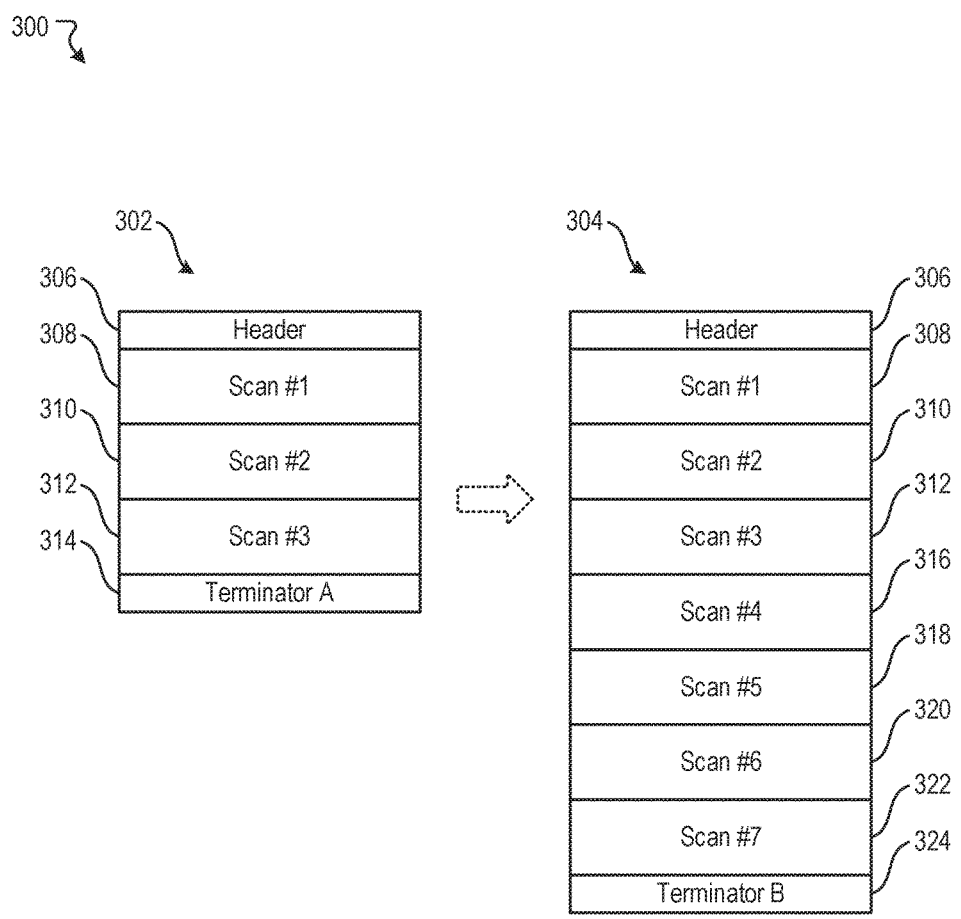
FIG. 3 illustrates an example scenario associated with providing progressive images based on data range requests, according to an embodiment of the present disclosure.

FIG. 3 illustrates an example scenario 300 associated with providing progressive images based on data range requests, according to an embodiment of the present disclosure. The example scenario 300 illustrates an example lower quality version 302 of an image and an example higher quality version 304 of the image. The image can correspond to a progressive image, such as a progressive JPEG image.

As shown, the example lower quality version 302 of the image can include or can be formed by a header file/element 306, a first quantity of progressive image scans (Scan #1 308, Scan #2 310, Scan #3 312), and a first terminator file/element 314. In this example scenario 300, the disclosed technology can generate the example higher quality version 304 of the image by combining the first quantity of progressive image scans (Scan #1 308, Scan #2 310, Scan #3 312) and a second quantity of progressive image scans (Scan #4 316, Scan #5 318, Scan #6 320, Scan #7 322). In particular, the disclosed technology can remove the first terminator file/element 314, append the second quantity to the first quantity, and add the second terminator file/element 324. As shown, the example higher quality version 304 of the image can include or can be formed by the header file/element 306, the first quantity of progressive image scans (Scan #1 308, Scan #2 310, Scan #3 312), the second quantity of progressive image scans (Scan #4 316, Scan #5 318, Scan #6 320, Scan #7 322), and a second terminator file/element 324. As discussed, all examples herein are provided for illustrative purposes and there can be many variations or other possibilities associated with the disclosed technology.

Figure 4:
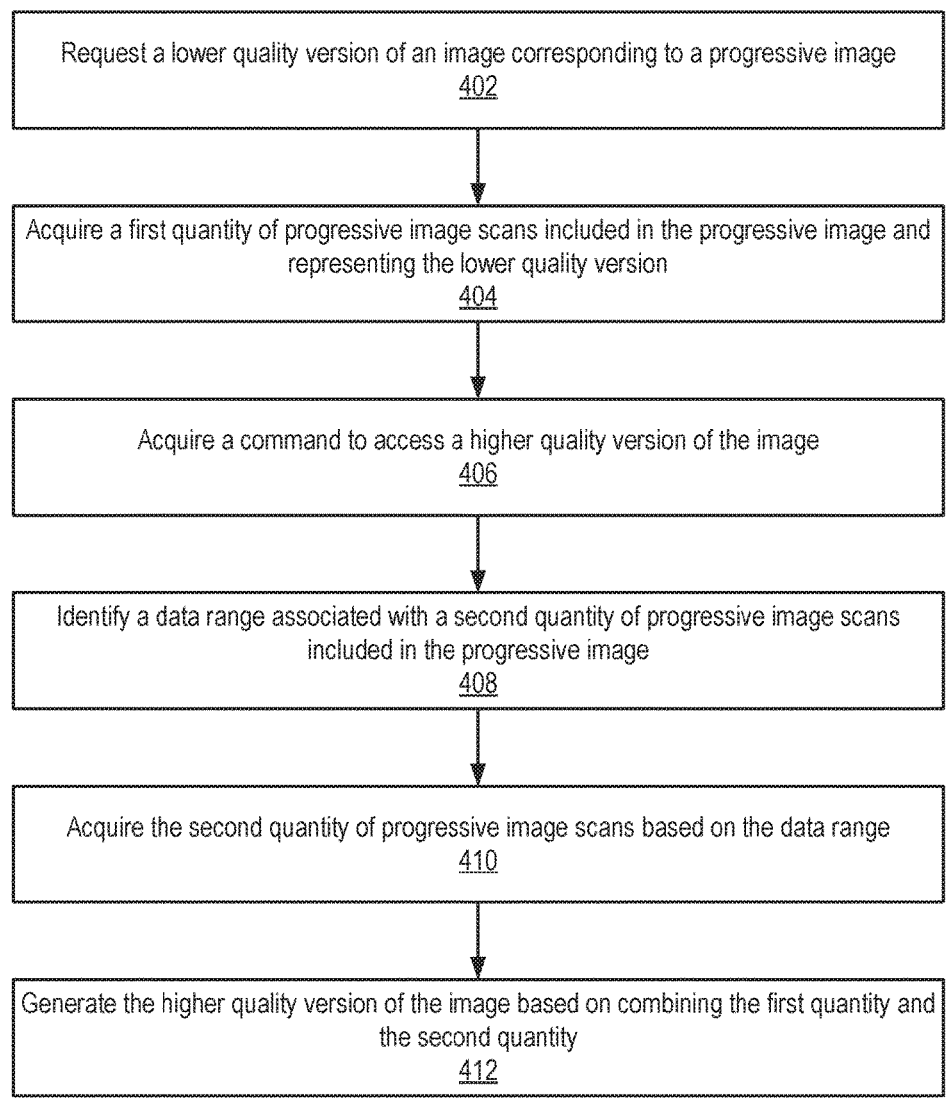
FIG. 4 illustrates an example method associated with providing progressive images based on data range requests, according to an embodiment of the present disclosure.

FIG. 4 illustrates an example method 400 associated with providing progressive images based on data range requests, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can request a lower quality version of an image, the image corresponding to a progressive image. At block 404, the example method 400 can acquire a first quantity of progressive image scans included in the progressive image. The first quantity of progressive image scans can represent the lower quality version of the image. At block 406, the example method 400 can acquire a command to access a higher quality version of the image. At block 408, the example method 400 can identify a data range associated with a second quantity of progressive image scans included in the progressive image. The second quantity of progressive image scans can be combinable with the first quantity of progressive image scans to represent the higher quality version of the image. At block 410, the example method 400 can acquire the second quantity of progressive image scans based on the data range. At block 412, the example method 400 can generate the higher quality version of the image based on combining the first quantity and the second quantity. In some cases, the above can be repeated for a third quantity, a fourth quantity, and so forth, in order to represent even higher quality versions of the image. Many variations are possible.

Figure 5:
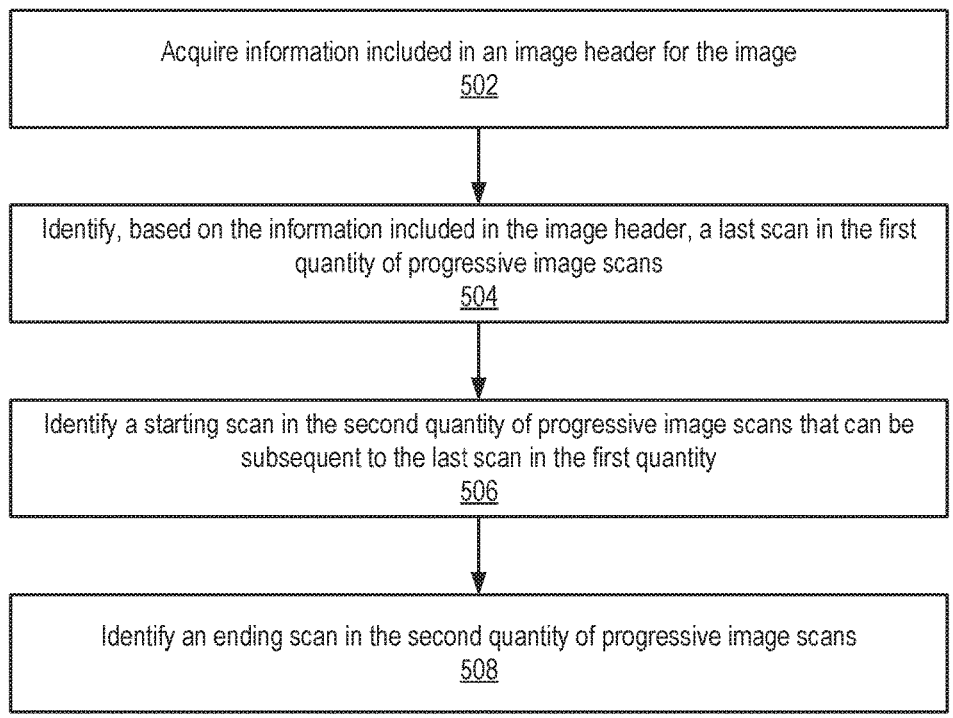
FIG. 5 illustrates an example method associated with providing progressive images based on data range requests, according to an embodiment of the present disclosure.

FIG. 5 illustrates an example method 500 associated with providing progressive images based on data range requests, according to an embodiment of the present disclosure. As discussed, it should be understood that there can be additional, fewer, or alternative steps performed in similar or alternative orders, or in parallel, within the scope of the various embodiments unless otherwise stated.

At block 502, the example method 500 can acquire information included in an image header for the image. At block 504, the example method 500 can identify, based on the information included in the image header, a last scan in the first quantity of progressive image scans. At block 506, the example method 500 can identify a starting scan in the second quantity of progressive image scans. The starting scan in the second quantity can be subsequent to the last scan in the first quantity. At block 508, the example method 500 can identify an ending scan in the second quantity of progressive image scans based on at least one of the information included in the image header, a system configuration, a device property, a network condition, a defined setting, or a user preference. The starting scan and the ending scan can be respectively associated with a start and an end for the data range.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
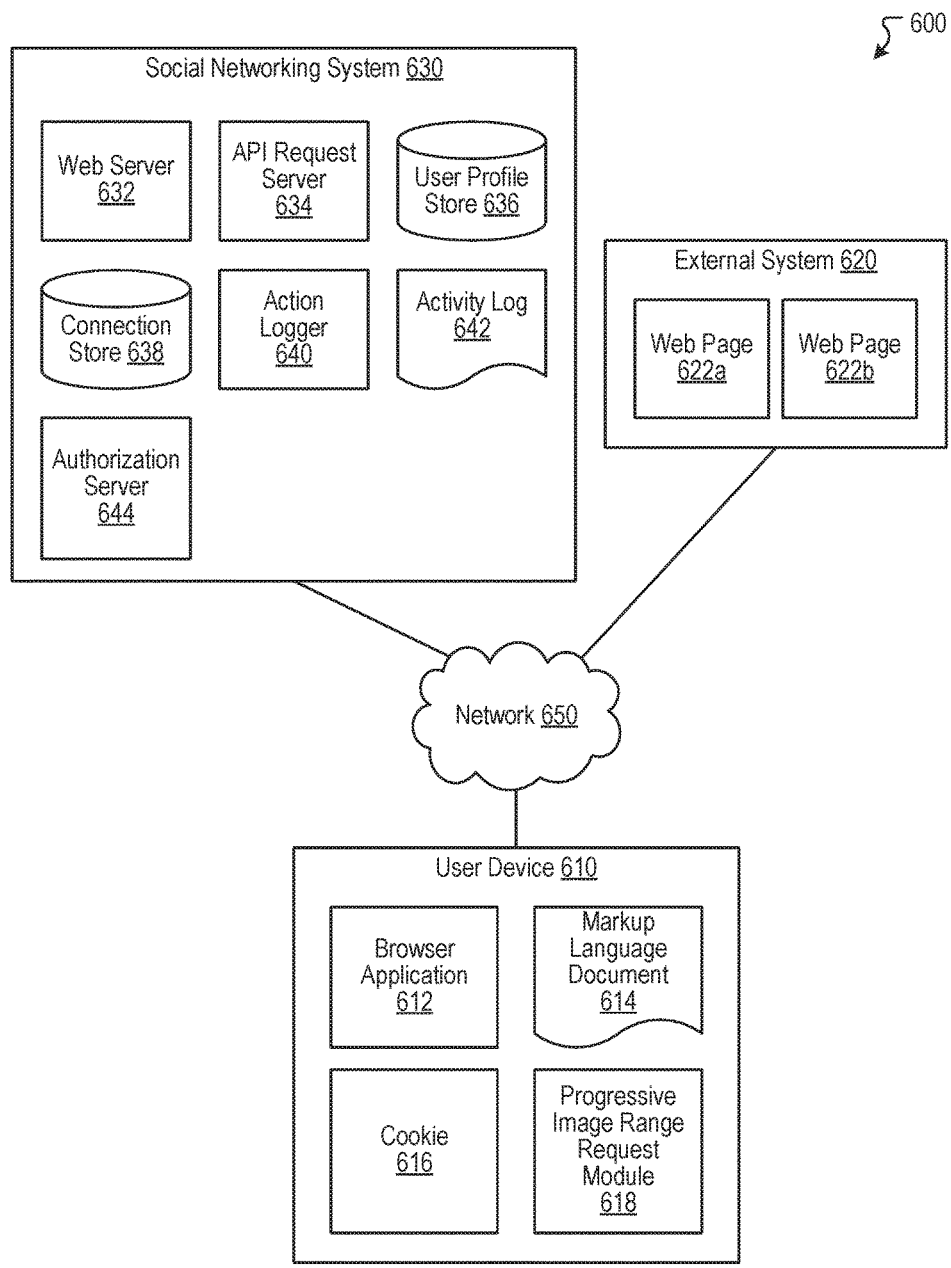
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet. In some embodiments, the social networking system 630 can include or correspond to a social media system (or service).

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11 (e.g., Wi-Fi), worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the user device 610 can include a progressive image range request module 618. The progressive image range request module 618 can, for example, be implemented as the progressive image range request module 102 of FIG. 1. As discussed previously, it should be appreciated that there can be many variations or other possibilities. For example, in some instances, the progressive image range request module (or at least a portion thereof) can be included or implemented in the social networking system 630. Other features of the progressive image range request module 618 are discussed herein in connection with the progressive image range request module 102.

Hardware Implementation

Figure 7:
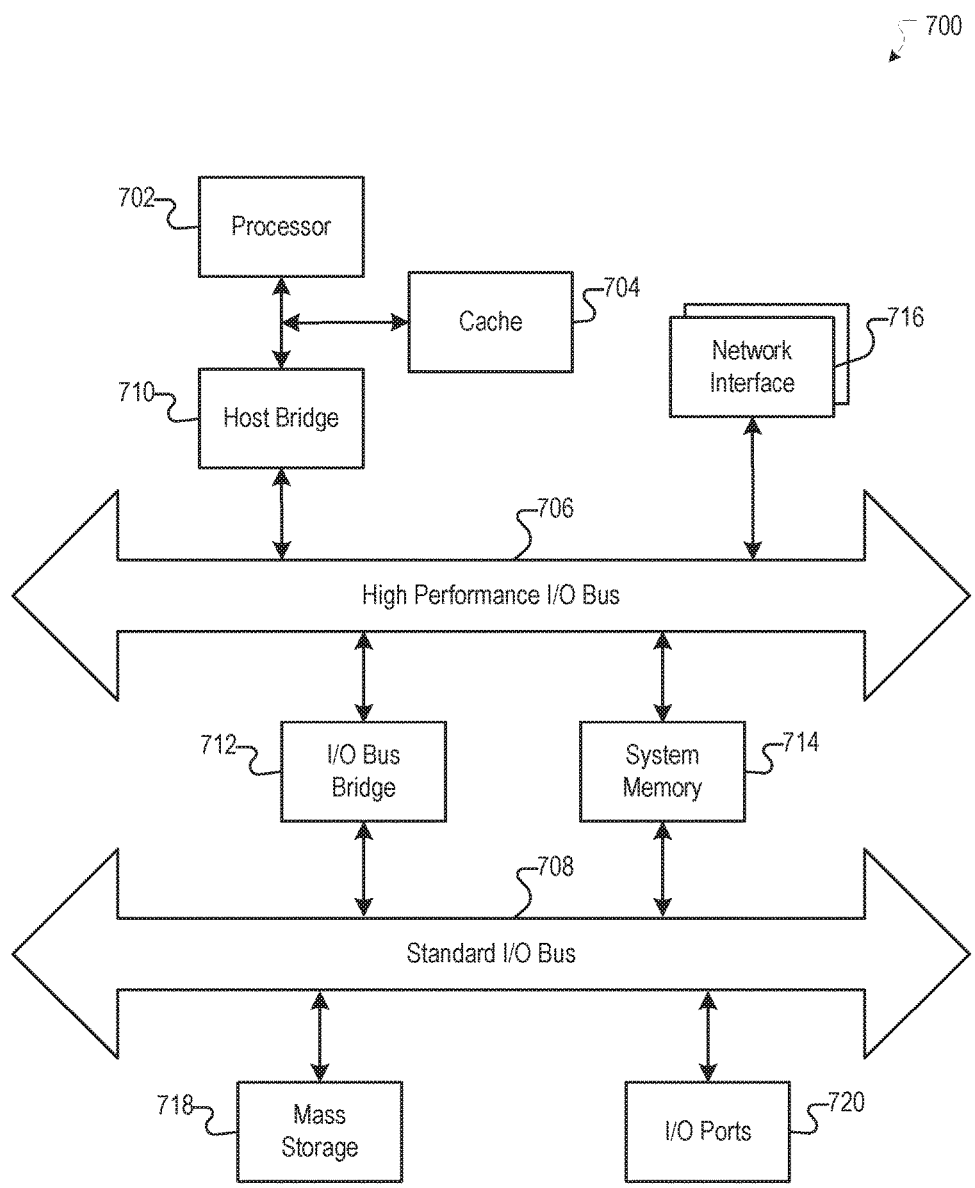
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  requesting, by a computing system, a lower quality version of an image, the image corresponding to a progressive image;
  acquiring, by the computing system, a first quantity of progressive image scans included in the progressive image, the first quantity of progressive image scans representing the lower quality version of the image;
  acquiring, by the computing system, a command to access a higher quality version of the image;
  identifying, by the computing system, a data range associated with a second quantity of progressive image scans included in the progressive image, wherein the data range indicates at least a last scan in the first quantity of progressive image scans, and wherein the second quantity of progressive image scans is combinable with the first quantity of progressive image scans to represent the higher quality version of the image;
  transmitting, by the computing system, to a content providing system, a data range request that specifies the data range;
  acquiring, by the computing system, from the content providing system, the second quantity of progressive image scans based on the data range; and
  generating, by the computing system, the higher quality version of the image based on combining the first quantity and the second quantity.

2. The computer-implemented method of claim 1, wherein identifying the data range associated with the second quantity of progressive image scans included in the progressive image further comprises:

acquiring information included in an image header for the image;

identifying, based on the information included in the image header, a last scan in the first quantity of progressive image scans;

identifying a starting scan in the second quantity of progressive image scans, the starting scan in the second quantity being subsequent to the last scan in the first quantity; and identifying an ending scan in the second quantity of progressive image scans based on at least one of the information included in the image header, a system configuration, a device property, a network condition, a defined setting, or a user preference, the starting scan and the ending scan being respectively associated with a start and an end for the data range.

3. The computer-implemented method of claim 2, wherein the image header includes a proprietary header, and wherein at least some of the information included in the image header is incorporated in the proprietary header.

4. The computer-implemented method of claim 1, wherein acquiring the second quantity of progressive image scans based on the data range further comprises:

generating a uniform resource locator (URL) that indicates the data range, wherein the data range request comprises a request for the second quantity of progressive image scans, and wherein the data range request for the second quantity of progressive image scans is associated with the URL; and receiving, from the content providing system, the second quantity of progressive image scans.

5. The computer-implemented method of claim 1, wherein acquiring the second quantity of progressive image scans based on the data range further comprises:

generating the data range request, wherein the data range request is a Hypertext Transfer Protocol (HTTP) range request that includes a byte range corresponding to the data range, the byte range being incorporated into a HTTP header associated with the HTTP range request; and receiving, from the content providing system, data corresponding to the byte range, the data representing the second quantity of progressive image scans.

6. The computer-implemented method of claim 1, wherein generating the higher quality version of the image based on combining the first quantity and the second quantity further comprises:

removing a first terminator element subsequent to the first quantity of progressive image scans;

appending the second quantity of progressive image scans to the first quantity of progressive image scans; and adding a second terminator element subsequent to the second quantity that has been appended to the first quantity.

7. The computer-implemented method of claim 1, wherein the command to access the higher quality version of the image is associated with at least one of a user interaction, a change in network connectivity, a social engagement trigger, or a time trigger.

8. The computer-implemented method of claim 1, wherein the lower quality version of the image is lower in resolution than the higher quality version of the image.

9. The computer-implemented method of claim 1, wherein the lower quality version of the image is associated with at least one of a preview version of the image or a thumbnail version of the image, and wherein the higher quality version of the image is associated with at least one of a full-screen displayable version of the image or an original resolution version of the image.

10. The computer-implemented method of claim 1, wherein the progressive image corresponds to a progressive Joint Photographic Experts Group (JPEG) image, and wherein each progressive image scan in the first quantity and in the second quantity corresponds to a respective progressive JPEG scan included in the progressive JPEG image.

11. A system comprising:

at least one processor; and a memory storing instructions that, when executed by the at least one processor, cause the system to perform:

requesting a lower quality version of an image, the image corresponding to a progressive image;

acquiring a first quantity of progressive image scans included in the progressive image, the first quantity of progressive image scans representing the lower quality version of the image;

acquiring a command to access a higher quality version of the image;

identifying a data range associated with a second quantity of progressive image scans included in the progressive image, wherein the data range indicates at least a last scan in the first quantity of progressive image scans, and wherein the second quantity of progressive image scans is combinable with the first quantity of progressive image scans to represent the higher quality version of the image;

transmitting, to a content providing system, a data range request that specifies the data range;

acquiring, from the content providing system, the second quantity of progressive image scans based on the data range; and generating the higher quality version of the image based on combining the first quantity and the second quantity.

12. The system of claim 11, wherein identifying the data range associated with the second quantity of progressive image scans included in the progressive image further comprises:

acquiring information included in an image header for the image;

identifying, based on the information included in the image header, a last scan in the first quantity of progressive image scans;

identifying a starting scan in the second quantity of progressive image scans, the starting scan in the second quantity being subsequent to the last scan in the first quantity; and identifying an ending scan in the second quantity of progressive image scans based on at least one of the information included in the image header, a system configuration, a device property, a network condition, a defined setting, or a user preference, the starting scan and the ending scan being respectively associated with a start and an end for the data range.

13. The system of claim 11, wherein acquiring the second quantity of progressive image scans based on the data range further comprises:

generating a uniform resource locator (URL) that indicates the data range, wherein the data range request comprises a request for the second quantity of progressive image scans, and wherein the data range request for the second quantity of progressive image scans is associated with the URL; and receiving, from the content providing system, the second quantity of progressive image scans.

14. The system of claim 11, wherein acquiring the second quantity of progressive image scans based on the data range further comprises:
generating the data range request, wherein the data range request is a Hypertext Transfer Protocol (HTTP) range request that includes a byte range corresponding to the data range, the byte range being incorporated into a HTTP header associated with the HTTP range request; and
receiving, from the content providing system, data corresponding to the byte range, the data representing the second quantity of progressive image scans.

15. The system of claim 11, wherein generating the higher quality version of the image based on combining the first quantity and the second quantity further comprises:
removing a first terminator element subsequent to the first quantity of progressive image scans;
appending the second quantity of progressive image scans to the first quantity of progressive image scans; and
adding a second terminator element subsequent to the second quantity that has been appended to the first quantity.

16. A non-transitory computer-readable storage medium including instructions that, when executed by at least one processor of a computing system, cause the computing system to perform a method comprising:
requesting a lower quality version of an image, the image corresponding to a progressive image;
acquiring a first quantity of progressive image scans included in the progressive image, the first quantity of progressive image scans representing the lower quality version of the image;
acquiring a command to access a higher quality version of the image;
identifying a data range associated with a second quantity of progressive image scans included in the progressive image, wherein the data range indicates at least a last scan in the first quantity of progressive image scans, and wherein the second quantity of progressive image scans is combinable with the first quantity of progressive image scans to represent the higher quality version of the image;
transmitting, to a content providing system, a data range request that specifies the data range;
acquiring, from the content providing system, the second quantity of progressive image scans based on the data range; and
generating the higher quality version of the image based on combining the first quantity and the second quantity.

17. The non-transitory computer-readable storage medium of claim 16, wherein identifying the data range associated with the second quantity of progressive image scans included in the progressive image further comprises:
acquiring information included in an image header for the image;
identifying, based on the information included in the image header, a last scan in the first quantity of progressive image scans;
identifying a starting scan in the second quantity of progressive image scans, the starting scan in the second quantity being subsequent to the last scan in the first quantity; and
identifying an ending scan in the second quantity of progressive image scans based on at least one of the information included in the image header, a system configuration, a device property, a network condition, a defined setting, or a user preference, the starting scan and the ending scan being respectively associated with a start and an end for the data range.

18. The non-transitory computer-readable storage medium of claim 16, wherein acquiring the second quantity of progressive image scans based on the data range further comprises:
generating a uniform resource locator (URL) that indicates the data range, wherein the data range request comprises a request for the second quantity of progressive image scans, and wherein the data range request for the second quantity of progressive image scans is associated with the URL; and
receiving, from the content providing system, the second quantity of progressive image scans.

19. The non-transitory computer-readable storage medium of claim 16, wherein acquiring the second quantity of progressive image scans based on the data range further comprises:
generating the data range request, wherein the data range request is a Hypertext Transfer Protocol (HTTP) range request that includes a byte range corresponding to the data range, the byte range being incorporated into a HTTP header associated with the HTTP range request; and
receiving, from the content providing system, data corresponding to the byte range, the data representing the second quantity of progressive image scans.

20. The non-transitory computer-readable storage medium of claim 16, wherein generating the higher quality version of the image based on combining the first quantity and the second quantity further comprises:
removing a first terminator element subsequent to the first quantity of progressive image scans;
appending the second quantity of progressive image scans to the first quantity of progressive image scans; and
adding a second terminator element subsequent to the second quantity that has been appended to the first quantity.

* * * * *